(12) United States Patent
Zuckerman et al.

(10) Patent No.: US 11,784,822 B2
(45) Date of Patent: Oct. 10, 2023

(54) SYSTEM AND METHOD FOR TRANSMITTING A NOTIFICATION TO A NETWORK

(71) Applicants: Lily Zuckerman, Boston, MA (US); William Behman, Wellesley, MA (US)

(72) Inventors: Lily Zuckerman, Boston, MA (US); William Behman, Wellesley, MA (US)

(73) Assignees: Lily Zuckerman, Boston, MA (US); William Behman, Wellesley, MA (US)

( * ) Notice: Subject to any disclaimer, the term of this patent is extended or adjusted under 35 U.S.C. 154(b) by 128 days.

(21) Appl. No.: 17/137,546

(22) Filed: Dec. 30, 2020

(65) Prior Publication Data
US 2022/0209960 A1 Jun. 30, 2022

(51) Int. Cl.
*H04L 9/32* (2006.01)
*H04L 9/06* (2006.01)
*H04L 9/00* (2022.01)

(52) U.S. Cl.
CPC .......... *H04L 9/3247* (2013.01); *H04L 9/0643* (2013.01); *H04L 9/3239* (2013.01); *H04L 9/3263* (2013.01); *H04L 9/3271* (2013.01); *H04L 9/50* (2022.05)

(58) Field of Classification Search
CPC ... H04L 9/3247; H04L 9/0643; H04L 9/3239; H04L 9/3263; H04L 9/3271; H04L 9/50
See application file for complete search history.

(56) References Cited

U.S. PATENT DOCUMENTS

| | | | |
|---|---|---|---|
| 9,721,239 B1* | 8/2017 | Ho | H04L 67/306 |
| 10,129,252 B1* | 11/2018 | Suen | H04L 63/0815 |
| 11,232,506 B1* | 1/2022 | Zielnicki | G06Q 10/083 |
| 2003/0105655 A1* | 6/2003 | Kimbrel | H04L 67/1001 |
| | | | 705/7.12 |
| 2016/0005010 A1* | 1/2016 | Brown | G06Q 20/384 |
| | | | 705/39 |
| 2017/0279616 A1* | 9/2017 | Loeb | H04L 67/535 |
| 2018/0062852 A1* | 3/2018 | Schmahmann | G06Q 10/101 |

(Continued)

OTHER PUBLICATIONS

Title: Cryptography and Game Theory: Designing Protocols for Exchanging Information Date: Mar. 2008 By: Gillat Kol, Moni Naor.

(Continued)

*Primary Examiner* — Taghi T Arani
*Assistant Examiner* — Blake I Narramore
(74) *Attorney, Agent, or Firm* — CALDWELL INTELLECTUAL PROPERTY LAW

(57) ABSTRACT

A system and method for transmitting a notification to a network includes a computing device, the computing device configured to identify at least a user venture of a plurality of user ventures, generate at least a network as a function of the user venture and at least a flutter element, wherein generating further comprises retrieving at least a user signature of a plurality of user signatures relating to the flutter element, producing at least an input as a function of the user signature using at least a cryptographic function, and generating the at least network as a function of the input and the user venture, identify at least a logical input as a function of the network using an authentication operator, and transmit a notification as a function of the logical input to at least the network.

20 Claims, 6 Drawing Sheets

(56) References Cited

U.S. PATENT DOCUMENTS

| | | | |
|---|---|---|---|
| 2018/0342020 A1* | 11/2018 | Sen | G06Q 10/06375 |
| 2021/0073400 A1* | 3/2021 | Shetty | H04L 67/02 |
| 2021/0374274 A1* | 12/2021 | Andreina | G06F 21/6245 |
| 2021/0377028 A1* | 12/2021 | Doney | H04L 9/3213 |
| 2021/0400053 A1* | 12/2021 | Jacobson | H04L 9/085 |
| 2022/0051283 A1* | 2/2022 | Chen | G06Q 30/0224 |
| 2022/0116470 A1* | 4/2022 | Sethi | H04L 67/55 |
| 2022/0292533 A1* | 9/2022 | Oosugi | G06Q 30/0204 |

OTHER PUBLICATIONS

Title: Description of Algorithms used in Cashlib Date: Aug. 12, 2010 By: Fujisaki-Okamoto.

* cited by examiner

SYSTEM AND METHOD FOR TRANSMITTING A NOTIFICATION TO A NETWORK

FIELD OF THE INVENTION

The present invention generally relates to the field of cryptography and network security. In particular, the present invention is directed to a system and method for transmitting a notification to a network.

BACKGROUND

A notification is often intercepted when attempting to transmit to a series of users and easily analyzed by the interceptor. This prevents a secured transfer of information as well as prevents a network from being established among a particular group of users.

SUMMARY OF THE DISCLOSURE

In an aspect a system for transmitting a notification to a network includes a computing device, the computing device configured to identify at least a user venture of a plurality of user ventures, generate at least a network as a function of the user venture and at least a flutter element, wherein generating further comprises retrieving at least a user signature of a plurality of user signatures relating to the flutter element, producing at least an input as a function of the user signature using at least a cryptographic function, and generating the at least network as a function of the input and the user venture, identify at least a logical input as a function of the network using an authentication operator, and transmit a notification as a function of the logical input to at least the network.

In another aspect a method for transmitting a notification to a network further comprises identifying, by a computing device, at least a user venture of a plurality of user ventures, generating, by the computing device, at least a network as a function of the user venture and at least a flutter element, wherein generating further comprises retrieving at least a user signature of a plurality of user signatures relating to the flutter element, producing at least an input as a function of the user signature using at least a cryptographic function, and generating the at least network as a function of the input and the user venture, identifying, by the computing device, at least a logical input as a function of the network using an authentication operator, and transmitting, by the computing device, a notification as a function of the logical input to at least the network.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for transmitting a notification to a network. In an embodiment, a system for transmitting a notification includes a computing device. Aspects of the present disclosure can be used to identify at least a user venture of a plurality of user ventures. Aspects of the present disclosure can also be used to generate at least a network as a function of the user venture and at least a flutter element. This is so, at least in part, because the system retrieves a user signature, produces an input as a function of the user signature and a cryptographic function, and generates the network as a function of the input and the user venture. Aspects of the present disclosure can also be used to identify at least a logical input as a function of the network using an authentication operator. Aspects of the present disclosure allow for transmitting a notification of the logical input to the network. Exemplary embodiments illustrating aspects of the present disclosure are described below in the context of several specific examples.

Figure 1:
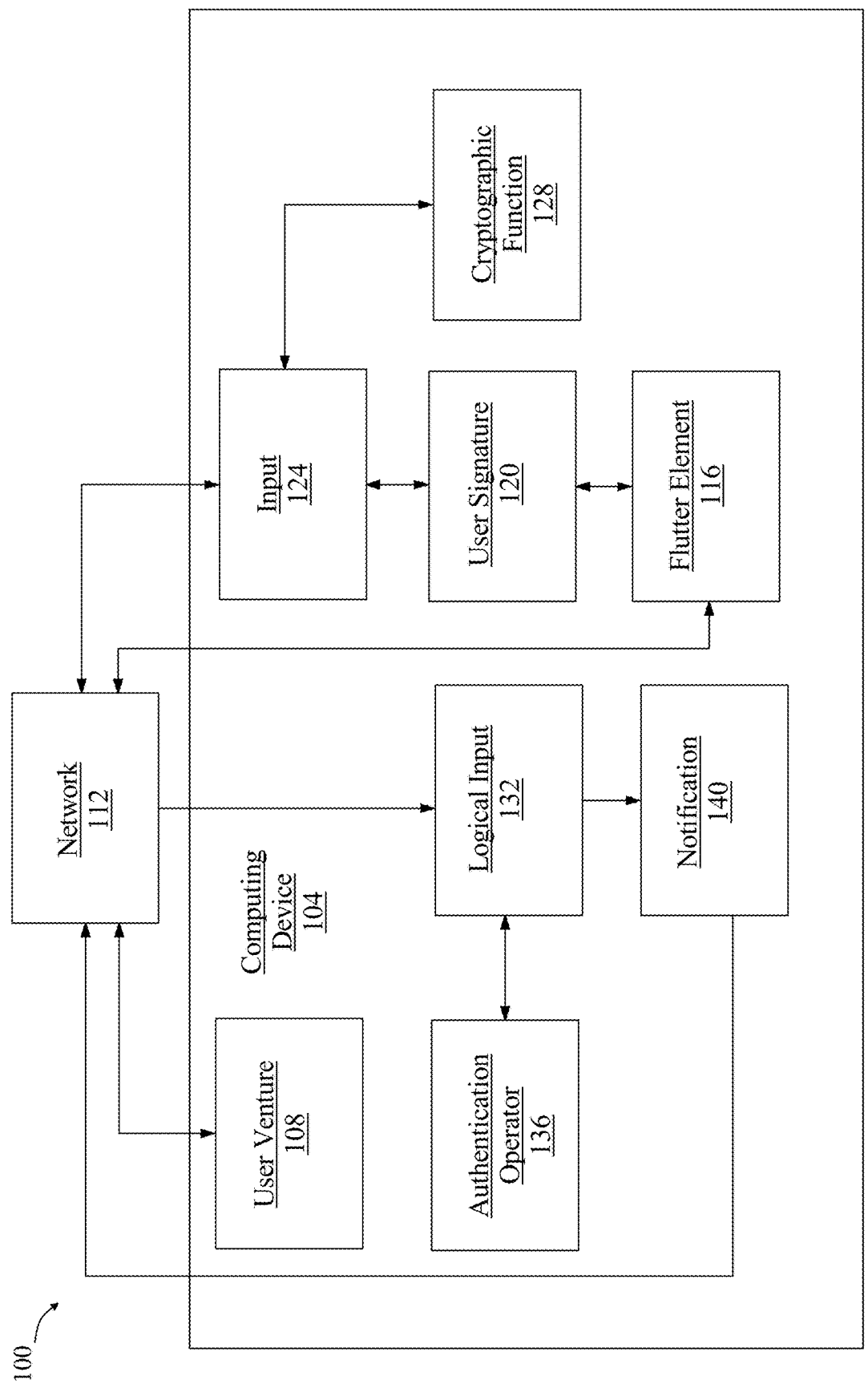
FIG. 1 is a block diagram illustrating an exemplary embodiment of a system for transmitting a notification.

Referring now to FIG. 1, an exemplary embodiment of a system 100 for transmitting a notification to a network is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Still referring to FIG. 1, computing device 104 is configured to identify at least a user venture 108 of a plurality of user ventures. As used in this disclosure "user venture" is a guideline and/or outline of a set of user qualifications relating to the outcome of an unpredictable event. For example, and without limitation, an unpredictable event of the weather may result in a user venture that outlines a particular time that it will precipitate. User venture 108 may include one or more constraints that at least restrict a particular aspect of the unpredictable event. As a non-limiting example a user venture may include an unpredictable event associated with a sporting event such as football, wherein a constraint may identify a particular number of minutes, touchdowns, and/or first downs that must be attained to fulfill the user venture. Additionally, or alternatively a user venture may have no constraints wherein particular guideline accounts for the event in its entirety without sub-categorical restraints.

With continued reference to FIG. 1, computing device 104 may identify user venture 108 by determining at least a two-value logical function. As used in this disclosure a "two-value logical function" is a function whose arguments, as well as the function itself, assume values from a two-element set. User venture 108 may be identified such that a venture may identify only two-elements as a result of the venture, that is the venture can either be true or false and cannot be both or neither at the same time. The two elements may include any value, sign, representation, indicator, and/or score that at least distinguishes one value from the other. As a non-limiting example a two-value logical function may include a Boolean function, wherein a Boolean function may identify two distinct values associated with one particular function. Two-value logical functions may include binary decision diagrams. As used in this disclosure a "binary decision diagram" is a structure that is used to represent a Boolean function, wherein there are two terminal nodes called a 0-terminal and a 1-terminal. Binary decision diagrams may be utilized as a function of the one or more constraints that user venture 108 identifies.

Still referring to FIG. 1, computing device 104 is configured to generate at least a network 112 by identifying a set of communication pathways to computing devices as a function of user venture 108 and at least a flutter element 116, wherein each communication pathway allows signals and/or transmissions to be transmitted amongst individuals on network 112. As used in this disclosure "network" is a group of broadcasting stations, computers, machines, and/or operators that are interconnected via a complex system of communication channels. Network 112 may include one or more local area networks, personal area networks, metropolitan area networks, wide area networks, wireless computer networks, storage-area networks, system-area networks, passive optical local area networks, enterprise private networks, virtual private networks, and the like thereof. Network 112 may include at least a garbled network. As used in this disclosure a "garbled network" is a cryptographic network that enables at least a two-party secure computation in which two or more mistrusting parties can jointly communicate and evaluate a function of their private inputs without the presence of a trusted third party. A garbled network may include one or more networks that at least prevent and/or limit the interception of one or more communications over network 112. As used in this disclosure "flutter element" is a datum relating to a prediction made by a user. Flutter element 116 may establish a prediction relating to one or more elements of user venture 108. As a non-limiting example flutter element 116 may relate to a prediction regarding the color of the sky at a particular point in time. As a further non-limiting example flutter element 116 may relate to one or more predictions of a particular video gaming competition.

Still referring to FIG. 1, computing device 104 retrieves at least a user signature 120 of a plurality of user signatures relating to flutter element 116. As used in this disclosure "user signature" is a distinctive signature relating to a particular user, such that the flutter element may be uniquely correlated to the user. As a non-limiting example a user signature may include one or more passwords associated with a user account. As a further non-limiting example a user signature may include one or more biometric signatures, wherein a biometric signature is a biologically identifying quality of an individual. Biometric signatures may include, without limitation, fingerprints, finger lengths, palm size, iris patterns, voice characteristics, retinal patterns, voice tones, facial orientation, skin tone, speech patterns, and the like thereof. User signature 120 may include one or more uniquely identifying electronic signatures of the user, such as emails, bank records, and telecommunication addresses. User signature 120 may include one or more distinct locations, such as residential addresses, career addresses, and/or remote addresses. As a non-limiting example, user signature 120 may include a user's iris patterns in conjunction with a bank record in conjunction with a residential address. As a further non-limiting example, user signature 120 may include a user's password of an account.

With continued reference to FIG. 1, network 112 is generated by producing at least an input 128. As used in this disclosure "input" is an encrypted data packet that relates to, represents, and/or includes the user signature. As a non-limiting example input 124 may include meaningful/meaningless data packets, wherein meaningful/meaningless data packets include arranging data in a larger data packet so as to prevent data pertaining to the user signature from being extracted. Input 128 may include one or more digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described below, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, input 124 may be produced using at least a cryptographic function. As used in this disclosure "cryptographic function" is a mathematical algorithm that transforms plaintext data into ciphertext that is incomprehensible without first being decrypted, wherein plaintext and ciphertext are described in detail above. Cryptographic function may be utilized to at least convert plain text data relating to user signature 120 into ciphertext data that is at least unrecognizable by network 112 and/or users communicating on network 112. Cryptographic function may be utilized to at least prevent user signature 120 from being distributed and/or accessible on network 112, protecting user signature 120 from being accessed inadvertently. Alternatively, cryptographic function may be used to convert ciphertext data into plaintext data as a function of converting input 124 to user signature 120. As a non-limiting example cryptographic function 120 may include one or more cryptographic hash functions, as described in detail below, in reference to FIG. 2. As a further non-limiting example, cryptographic functions may include one or more commitment cryptographic primitives, wherein a commitment cryptographic primitive is a scheme that allows one to commit to a chosen value while keeping it hidden to others with the ability to reveal the committed value later, as described in detail below, in reference to FIG. 2. Cryptographic function 120 may include at least a secure multiparty computation, wherein a secure multiparty computation is a mathematical process for creating methods for users to jointly compute a function whilst maintaining complete privacy, as described in detail below, in reference to FIG. 2.

Still referring to FIG. 1, computing device 104 is configured to identify at least a logical input 132 as a function of network 112 using an authentication operator 136. As used in this disclosure "logical input" is an input that fulfills the guidelines and/or outlines of user venture 108. As a non-limiting example logical input 132 may be a value of 1, wherein a value of 1 satisfies the user venture of a sporting event winner. As a further non-limiting example logical input 132 may relate to an input that correctly identifies the next technological advance. As used in this disclosure "authentication operator" is a mathematical method that at least authenticates that input 124 fulfills the guidelines, outline, and/or requirements established by user venture 108. Computing device 104 may identify logical input 124 as a function of retrieving at least a validity parameter as a function of the user venture. As used in this disclosure "validity parameter" is one or more variables that identify a valid input relating to the user venture. For example, a validity parameter may include a specific score of a sports event that must be reached for an input to be a logical input. As a further non-limiting example a validity parameter may include a specific pattern of a series of numbers that must be matched for an input to be a logical input. Computing device 104 may determine at least a validity component of input 124 as a function of the authentication operator. As used in this disclosure a "validity component" is a datum of input 124 that at least relates to, represents, and/or includes the validity parameter that must be fulfilled. For example, and without limitation, a validity component of an input may include a particular datum of a plurality of data relating to a particular user venture of a plurality of user ventures. As a further non-limiting example a validity component may include a pattern recognition of 5 objects, wherein each object would be a validity component of input 124.

Still referring to FIG. 1, authentication factor 136 may include one or more authentication functions such as single-factor authentication and/or multi-factor authentication. Single factor authentication requires that at least one authentication factor is established, whilst multi-factor authentication requires that at least two authentication factors be established. An authentication factor may include knowledge factors, wherein knowledge factors relate to data that logical input 132 relays. An authentication factor may include ownership factors, wherein ownership factors include relate to data that logical input 132 has controls and/or maintains. An authentication factor may include inherence factors, wherein inherence factors relate to data that logical input 132 may or may not do. As an example, and without limitation, authentication operator 136 may confirm that logical input 132 fulfills user venture 108 by using a knowledge factor that at least identifies if logical input 132 answers the question and/or pattern outlined.

Still referring to FIG. 1, computing device 104 may identify logical input 132 by determining at least a k-server algorithm. As used in this disclosure "k-server algorithm" is a mathematical model that at least minimizes a total distance required to authenticate the logical input, wherein a total distance is the number of servers and/or models required to authenticate the logical input. For example, and without limitation, a logical input may be required to be identified by a plurality of computing devices, that at least have access to authentication operator 136, wherein each computing device provides an authentication of logical input 132. The k-server algorithm may be determined by identifying at least a server in a domain of discourse. As used in this disclosure a "server" is an external device and/or network that is capable of operating authentication operator 136. As a non-limiting example, a server may include one or more computing devices, computing programs, computing softwares, and the like thereof. As used in this disclosure "domain of discourse" is the universe that network 112 establishes. For example and without limitation, the domain of discourse may include 17 computing devices that are communicating on network 112. As a further non-limiting example a domain of discourse may include 5,000 computers that are communicating on network 112. Computing device 104 may obtain at least a request on the domain of discourse. As used in this disclosure "request" is a signal, bit, notification, and or demand for the server to perform authentication operator 136 of a given logical input, such that an authentication of the logical input may be conducted by the server. The k-server algorithm may then minimize a distance metric from the server to the request such that a minimum distance is required to at least authenticate a given request. As used in this disclosure a "distance metric" is a measurable amount of space between two or more servers. As a non-limiting example, k-server algorithm may identify a total distance of 15 miles amongst 12 servers, wherein the distance may be minimized to travel 7 miles to achieve the same magnitude of authentication. The k-server algorithm may identify a minimum number of servers that are required to at least authenticate logical input 132. For example, and without limitation, 210 servers may be on network 112, wherein k-server algorithm may identify that only 32 servers are required to authenticate a particular logical input. As a further non-limiting example, the k-server algorithm then determine a total distance of the 210 servers and identify a minimum distance associated with 32 servers to at least minimize the total distance required to travel to authenticate logical input 132.

Still referring to FIG. 1, computing device 104 is configured to transmit a notification 140 as a function of logical input 132 to at least network 112. As used in this disclosure "notification" is a signal and/or indicator that a logical input has fulfilled the user venture. Notification 140 may be a wired and/or wireless communication. The wireless communication signals may include, without limitation, radio waves, electric fields, mobile broadband, Wi-Fi, and/or the BLUETOOTH protocol promulgated by Bluetooth SIG, Inc. of Kirkland, Wash., wherein Bluetooth is a wireless technology used for exchanging data between fixed mobile devices over short distances using ultra high frequency radio waves between 2.402 GHz to 2.480 GHz. As a non-limiting example a notification may indicate that a user has fulfilled and/or won a wager amongst a plurality of users in network 112. As a further non-limiting example a notification may be sent to individuals that have not fulfilled and/or won a wager, wherein the notification transmits a signal that the individual has failed or lost a wager.

Still referring to FIG. 1, notification 140 may be transmitted that relates to, represents, and/or includes a community-based authentication element. As used in this disclosure "community-based authentication element" is a notification that signals users to enter and/or input an authentication element relating to user venture 108. As used in this disclosure "authentication element" is an element that a client enters that validates and/or invalidates logical input 132. As a non-limiting example, a client device may receive a notification that a logical input has been identified, wherein a client may validate the logical input by confirm the authenticity of the logical input and/or the client may invalidate the logical input by denying the authenticity of the logical input. The client device may then transmit the community-based authentication parameter to computing device 104 using network 112, wherein logical input 132 may be confirmed as a function of the community-based authentication parameter and notification 140 may be transmitted to network 112 to notify the client devices that a logical input has been identified. Additionally or alternatively, computing device 104 may determine a minimum amount of community-based authentication parameters that need to be transmitted to at least authenticate logical input 132. As a non-limiting example computing device 104 may identify 210 servers on network 112, wherein computing device 104 may identify a minimum of 32 community-based authentication elements are required to authenticate a logical input.

Still referring to FIG. 1, computing device 104 may incentivize a client to enter the community-based authentication element using an encouragement model. As used in this disclosure an "encouragement model" is an algorithm that relates a number of authentication elements to an incentive reward, wherein an incentive reward may include a thing, object, and/or element that a client would desire and/or want. As a non-limiting example a client may receive an incentive reward after entering a total of 20 authentication elements. As a further non-limiting example, an incentive reward may be achieved for entering 10 authentication elements, wherein 9 of the authentication elements resulted in a logical input being determined. Additionally or alternatively, an incentive reward may include a credit and/or monetary value that a client may use as a flutter element towards a user venture. As a non-limiting example, a client may enter 35 authentication elements, wherein $5.00 may be awarded to the client that allows the client to wager in a secondary flutter element relating to a secondary user venture.

Still referring to FIG. 1, computing device 104 transmits notification 140 by decoding at least input 124 of network 112. Input 124 may be decoded by determining at least a decoding key as a function of a cryptosystem algorithm. As used in this disclosure a decoding key is a datum and/or parameter that determines the functional output of cryptosystem algorithm. Decoding key may consist of any translational input that transforms and/or decodes plaintext into ciphertext. Decoding key may include any of the cryptosystem as described in detail above. Decoding key may include one or more private keys, wherein private keys are asymmetric key algorithms that at least decrypt and sign that text to at least identify the text and/or data has been decoded. Decoding key may consist of one or more decoding key sizes, wherein a decoding key may range from 80 bits to 3072 bits, wherein a bit is one article of the text and/or data that is to be decrypted. As a non-limiting example a decoding key may include a private signature key, public signature verification key, symmetric authentication key, private authentication key, public authentication key, symmetric data encryption key, symmetric key wrapping key, symmetric random number generation key, asymmetric random number generation key, symmetric master key, private key transport key, public key transport key, symmetric key agreement key, private static key agreement key, public static key agreement key, private ephemeral key agreement key, public ephemeral key agreement key, symmetric authorization key, private authorization key, public authorization key, and the like thereof. As used in this disclosure used in this disclosure "cryptosystem algorithms" are algorithms that at east scramble and/or extract text from a plurality of text and/or datum. Cryptosystem algorithms may generate a mass of random characters, that at least prevent an unintended translation of the coded message. Cryptosystem algorithm may include, without limitation one or more Triple Data Encryption Standard algorithms, RSA algorithms, Blowfish algorithms, Twofish algorithms, Advanced Encryption Standard algorithms, and the like thereof. Additionally or alternatively, the decoding key may identify at least a uniform resource identifier of input 124/As used in this disclosure "uniform resource identifier" is a string of characters that unambiguously identifies a particular element pertaining to the user. As a non-limiting example a particular bank account may be identified as a uniform resource identified associated with input 124. Input 124 may be decoded as a function of the uniform resource identifier to at least identify one or more decrypted messages, communications, and/or notifications.

Still referring to FIG. 1, computing device 104 may identify at least a user as a function of the decoded input relating to user signature 120. As a non-limiting example decoded input may identify one or more user signatures such as bank statements, addresses, emails, signatures, passwords and the like thereof. A user may be identified according to the one or more user signatures associated with input 124. As a non-limiting example, a user signature of an email address may be identified according to the decoded input such that notification 140 may be transmitted to the user email address to at least notify of a win or a loss in a particular wager. Additionally or alternatively, computing device 104 may transmit notification 140 identified user using one or more transmission elements, wherein a transmission element may include without limitation, displaying a particular winner and/or loser signal, transmitting a telecommunication signal, filling a particular bank account with the royalties won, and the like thereof. Transmitting may include presenting to the user, displaying, sending a signal, filling a bank account.

Figure 2:
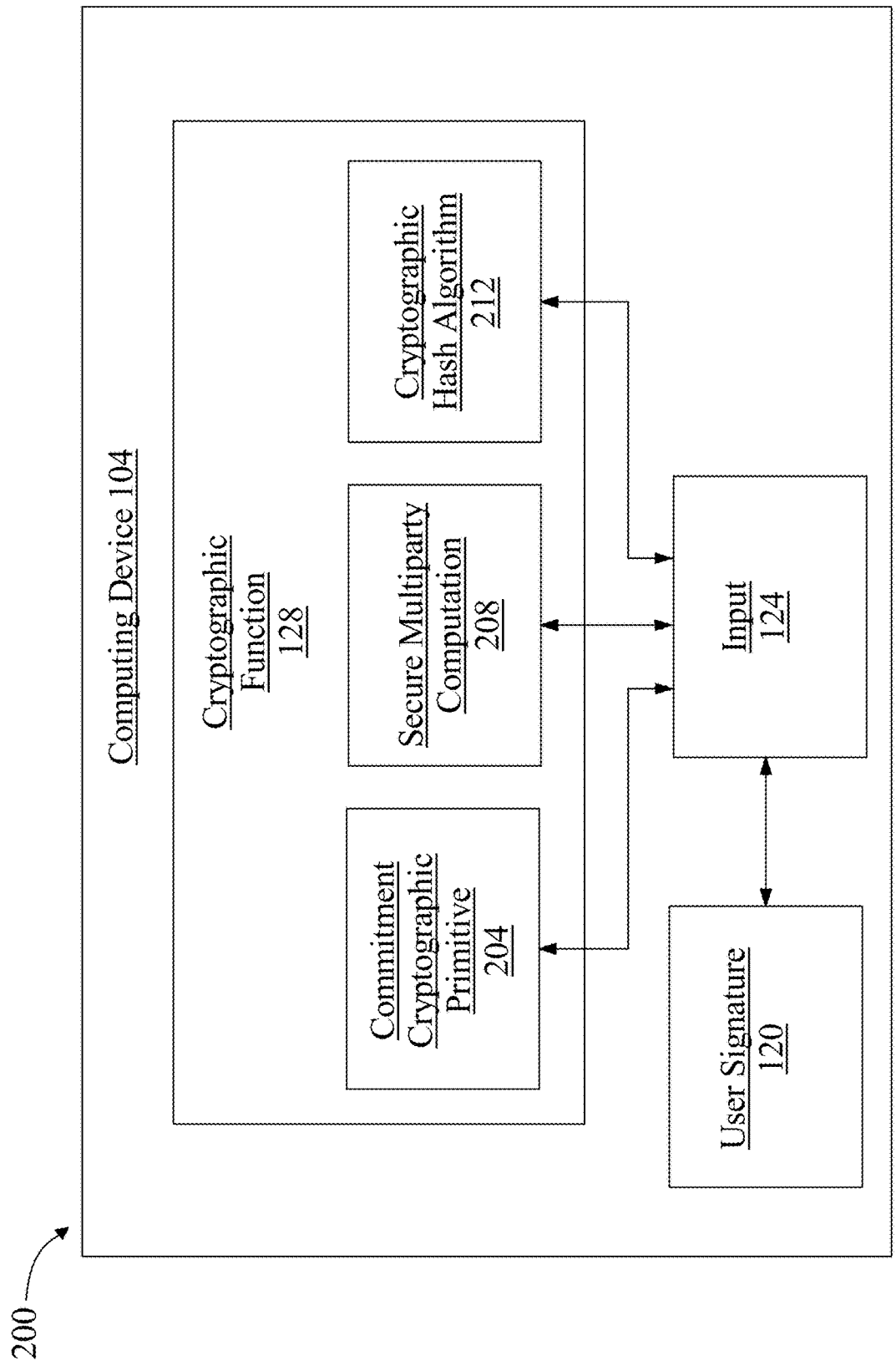
FIG. 2 is an exemplary embodiment of cryptographic functions according to an embodiment of the invention.

Now referring to FIG. 2, an exemplary embodiment 200 of a cryptographic function 128 according to an embodiment of the invention is illustrated. Cryptographic function 128 may include at least a commitment cryptographic primitive 204. As used in this disclosure "commitment cryptographic primitive" is a scheme that allows one to commit to a chosen value while keeping it hidden to others with the ability to reveal the committed value later. Commitment cryptographic primitive 204 may be designed so that a user cannot change the value or statement after they have submitted and/or committed to the value. Commitment cryptographic primitive 204 may include a "vector commitment" which may act as an accumulator in which an order of elements in set is preserved in its root and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). In addition to Merkle trees, commitment cryptographic primitive 204 may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described below. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Still referring to FIG. 2, commitment cryptographic primitive 204 may include one or more cryptographic hiding commitments. As used in this disclosure, "cryptographic hiding commitment" is one or more commitment schemes that at least contain and/or hide secret information and/or a secret datum within the commitment scheme. As a non-limiting example cryptographic hiding commitment may include a Fujisaki-Okamoto commitment scheme, wherein a Fujisaki-Okamoto commitment scheme is a statistically hiding, computationally binding commitment scheme. As a further non-limiting example a committer commits to something and sends the resulting commitment to the verifier, wherein the verifier needs to verify that the opening of the commitment matches the commitment previously sent. The Fujisaki-Okamoto commitment scheme uses a special RSA group, wherein an untrusted party generates the RSA group needed to prove to the committer that each $g_i$ may be in the group generated by h, so that the commitment may be statistically hiding. This can be done by proving in zero knowledge the knowledge of $a_i$ such that $g_i = h^{a_i}$ mod n. The committer may not generate or know p, q, p', q', $a_1, \ldots, a_m$, as otherwise the scheme will not provide any meaningful binding property. Additionally or alternatively, cryptographic hiding commitment may include a Pedersen commitment scheme, wherein a Pedersen commitment scheme is a statistically hiding, computationally binding commitment scheme that allows for commitments to values between 1 and primeOrder−1. The Pedersen commitment scheme may use a prime-order group, wherein an untrusted party generates the prime-order group, then the participants, both the committer and the verifier, need to check that both primeModulus and primeOrder are primes, such that primeOrder divides primeModulus−1 and that $g_i$, h have order primeOrder, which may be equivalent to saying that $g_i \neq 1$ mod primeModulus and $g^{primeOrder}_i = 1$ mod primeModulus. In the Pedersen commitment scheme the committer may not know the relative discrete logarithms of the bases, or otherwise the commitment may no longer be binding.

Still referring to FIG. 2, commitment cryptographic primitive 204 may include one or more secure proofs. As used in this disclosure a "secure proof," is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 2, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 2, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 2, zero-knowledge proof may include any other suitable zero-knowledge proof Zero-knowledge proof may include, without limitation bullet-proofs. Zero-knowledge proof may include a homomorphic public-key cryptography (hPKC)-based proof. Zero-knowledge proof may include a discrete logarithmic problem (DLP) proof Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

Still referring to FIG. 2, an embodiment may include a secure proof that is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 2, cryptographic function 120 may include at least a secure multiparty computation 208. As used in this disclosure "secure multiparty computation" is a process whereby at least two parties, which may be devices furnishing inputs such as binary inputs, provide inputs to a process that performs a calculation using the inputs to produce a result; each set of inputs is based on a secret possessed by the corresponding party. Two-party computations include user that prepares a network and sends it to a user that is a receiver, who obliviously evaluates the network, learning the encodings corresponding to both the receiver's and the user's output. The receiver then transmits back the user's encoding, allowing the user to compute his part of the output. The user sends the mapping from the receivers output encodings to bits to the receiver, allowing the receiver to obtain the output. Two-party computations include at least a double-keyed symmetric encryption scheme that at least encodes the scheme with a random number and/or label. If each party to a secure multiparty computation submits its inputs according to an assumed set of protocols, then neither party nor any observer to the process can deduce either secret, even given the circuit performing the calculation and both sets of inputs. Inputs may be provided to circuit using, for instance, oblivious transfer protocols, wherein party providing input provides a secret share based on secret to the circuit without being in a position to determine which secret share has been provided. Exemplary secure multiparty computation processes include without limitation the Yao's Garbled Circuits solution to the "millionaire's problem"; persons skilled in the art, upon reviewing the entirety of this disclosure, will be aware of various protocols for implementation of secure multiparty computation that may be applied to perform secure proof as described herein.

Still referring to FIG. 2, secure multiparty computation 208 may include multiparty-protocols. Multi-party protocols may include at least three or more parties wherein data in the network is shared amongst the parties and a protocol is then used to evaluate each element of the data. Multi-party protocols may incorporate one or more secret sharing schemes that at least allow onto distribute a secret among a number of parties by distributing shares to each party. Secret sharing scheme may include Shamir secret sharing and additive secret sharing. Shamir secret sharing scheme allows the data in the network to be secured against a passive adversary when and an active adversary when while achieving information-theoretic security, wherein even if the adversary has unbounded computational power, they cannot learn any information about the secret underlying a share. Alternatively, additive secret sharing schemes allows the data in the network to tolerate the adversary controlling all but one party, while maintaining security against a passive and active adversary with unbounded computational power.

Still referring to FIG. 2, cryptographic function 120 may include a cryptographic hash algorithm 212. As used in this disclosure "cryptographic hash algorithm" is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 2, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Figure 3:
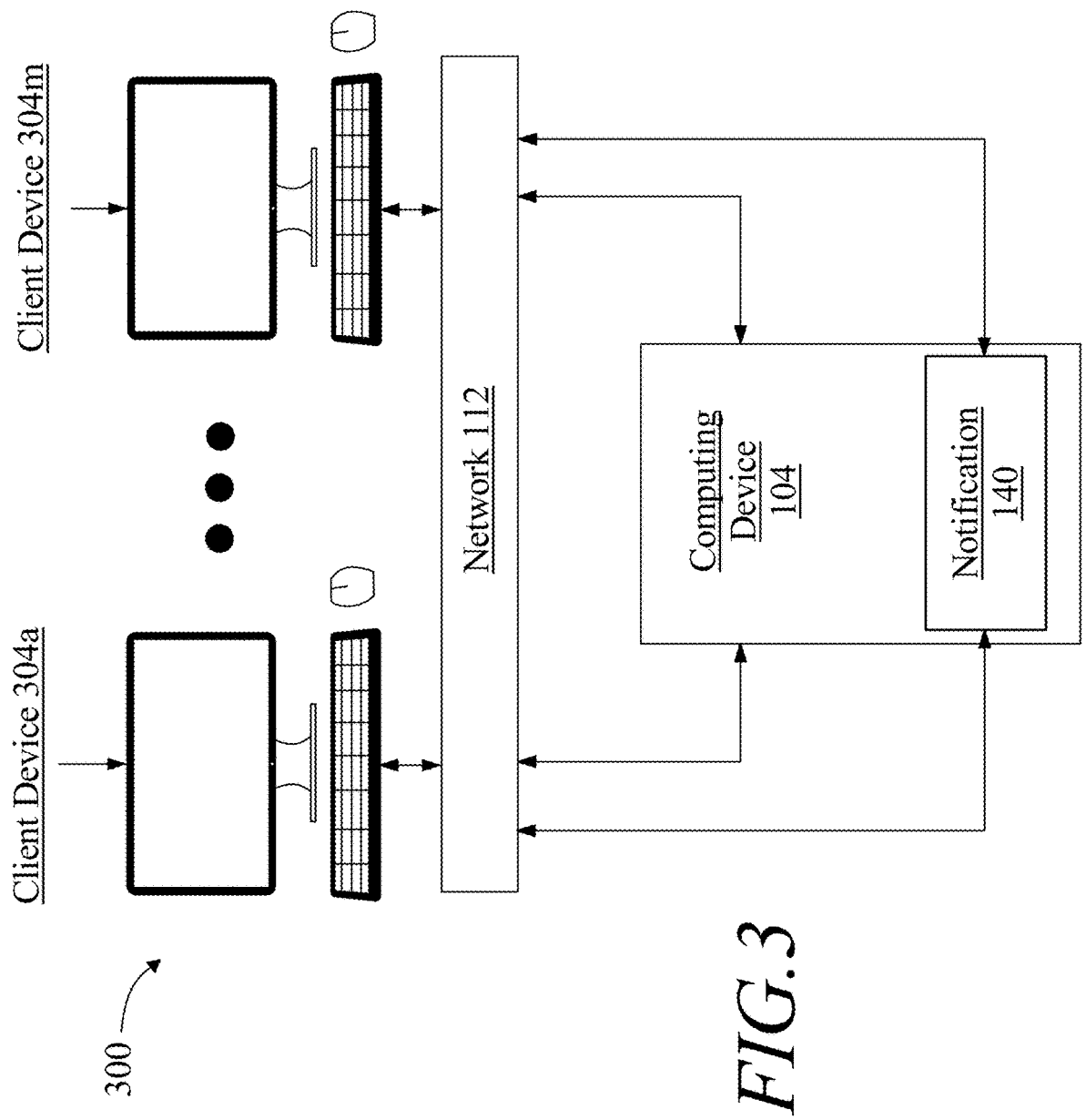
FIG. 3 is an exemplary embodiment of a network to communicate across multiple client devices according to an embodiment of the invention.

Now referring to FIG. 3, an exemplary embodiment 300 of a network to communicate across multiple client devices according to an embodiment of the invention is illustrated. Network 112 may communicate with a client device 304a of a plurality of client devices 304a-m. As used in this disclosure a "client device" is a device that is operated by a user that at least allows a user enter a user venture and/or a flutter element. Client device 304a-m may communicate with network 112 using one or more communication techniques as described above in detail in reference to FIG. 1. Client device 304a-m may be tethered to computing device 104 and/or may be remotely connected via one or more telecommunication devices. As a non-limiting example client device 304a-m may include a graphical user interface, a human-machine interface, a compositive user interface, and the like thereof. As a further non-limiting example client device 304a-m may include at least a mobile device, laptop, tablet, computer, desktop, telephone, smartphone, smart watch, E-reader, gaming console, netbook, personal digital assistant, phablet, pager, wearable computer, and the like thereof.

Figure 4:
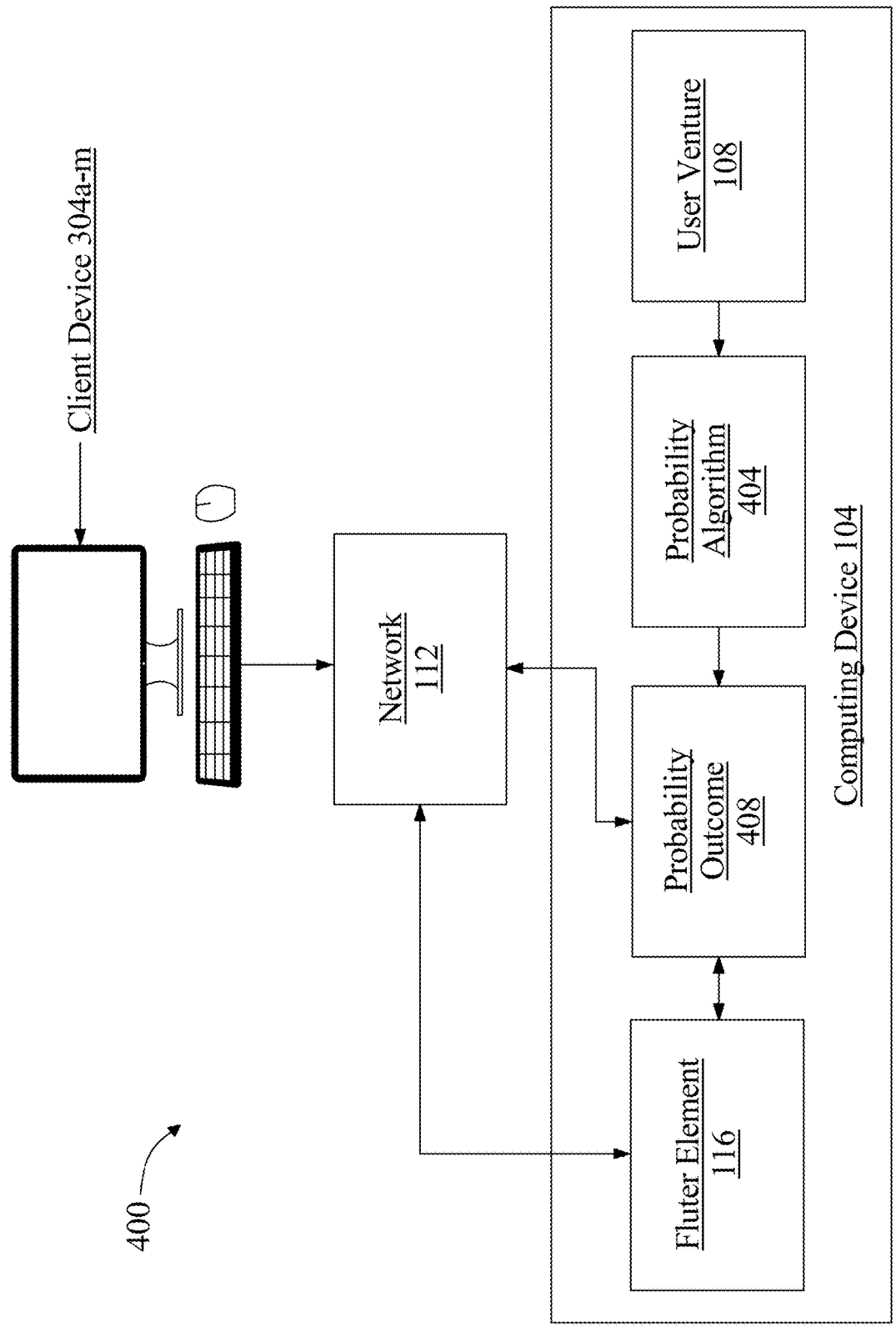
FIG. 4 is an exemplary embodiment of a probability outcome according to an embodiment of the invention.

Now referring to FIG. 4, computing device 104 may generate network 112 as a function of determining at least a probability algorithm 404 as a function of user venture 108.

As used in this disclosure "probability algorithm" is a mathematical model of assigning a prior probability to a given observation. Probability algorithm 404 may relate to one or more probability spaces that at least assign a measure taking a value between 0 and 1 to a set of outcomes that may or may exist within a given sample space. Probability algorithm may include one or more algorithms that at least provide mathematical abstractions of non-deterministic or uncertain processes or measured quantities that may either be single occurrences or evolve over tie in a random fashion, wherein algorithms may include, without limitation, random variables, probability distributions, stochastic processes, and the like thereof. Probability algorithm 404 may define a probability outcome 408 as a function of user venture 108. As used in this disclosure "probability outcome" is a numerical description of how likely an event is to occur and/or how likely it is that an input will be a logical input. Probability outcome may be represented by a numerical between 0 and 1, wherein 0 indicates an impossibility of the event and 1 indicates a certainty of the event to occur. The higher the likelihood of the event to occur the larger the number of probability outcome 408. As a non-limiting example probability outcome 408 may indicate that flutter element 116 has a 0.06 likelihood for the input to be a logical input. As a further non-limiting example probability outcome 408 may indicate that flutter element 116 has a 0.91 likelihood for the input to be a logical input. Probability outcome 408 may or may not be presented to the user via client device 304a-m after flutter element 116 is received by computing device 104. Probability outcome 408 may be defined as a function of an external source of randomness, such as an outcome of a particular event and/or occurrence. As a non-limiting example probability outcome 408 may indicate that flutter element 116 has a 0.84 likelihood for the input to be a logical input as a function of a particular sporting event, wherein the likelihood may be altered to 0.23 for the input to be a logical input as a function of an alteration in the sporting event. External source of randomness may be non-uniform and/or may have a non-uniform probability weighting. As a non-limiting example, probability outcome 408 may indicate the non-uniform probability weighting wager statistics for each potential flutter element that may be established.

Figure 5:
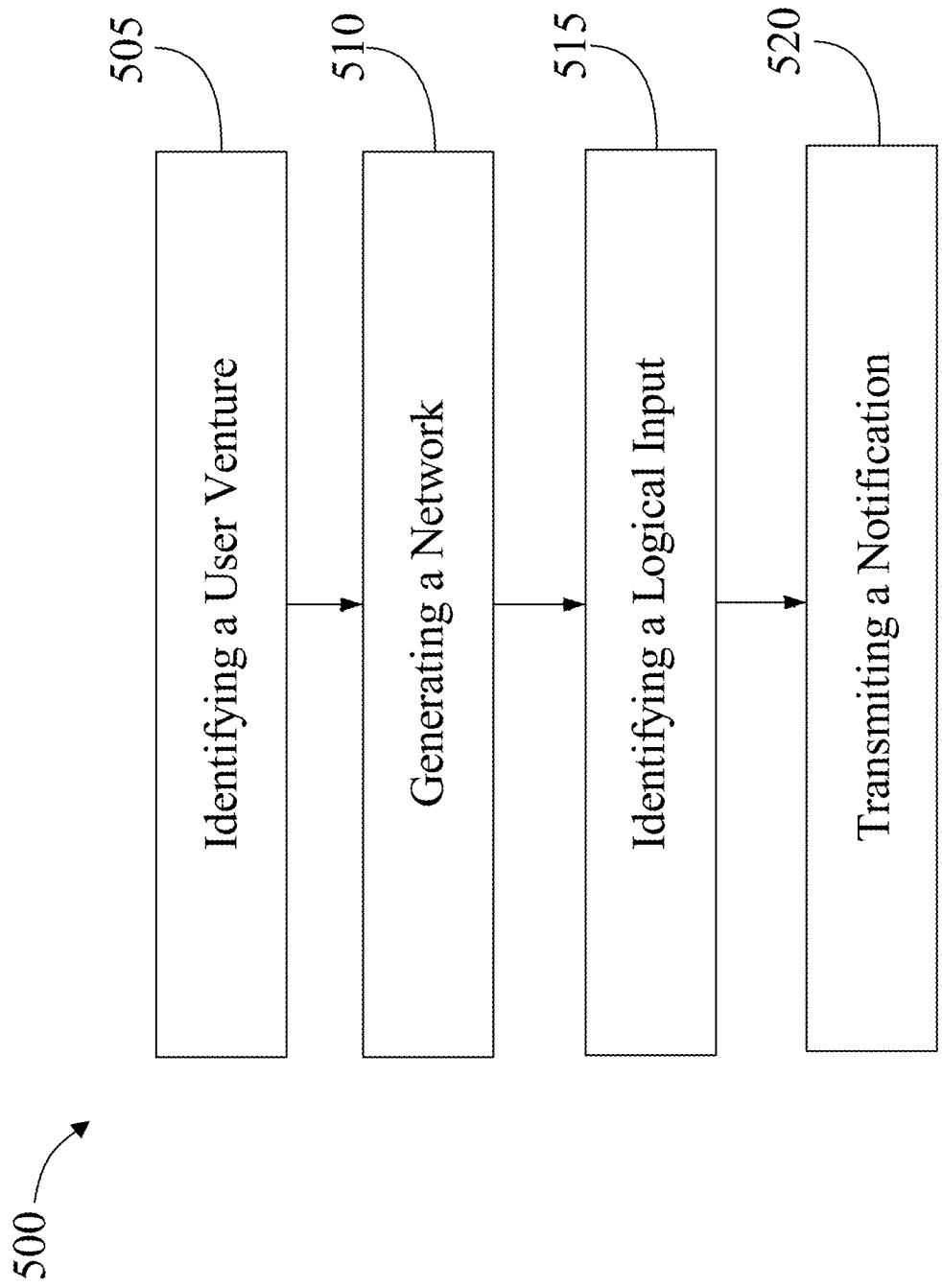
FIG. 5 is a flow diagram illustrating an exemplary embodiment of a method for transmitting a notification.

Now referring to FIG. 5, an exemplary embodiment of a method 500 for transmitting a notification to a network is illustrated. At step 505, a computing device 104 identifies a user venture 108 of a plurality of user ventures. User venture 108 includes any of the user venture 108 as described above, in reference to FIGS. 1-4. As a non-limiting example, computing device 104 may retrieve user venture that pertains to one or more wagers and/or bets relating to an unknown event.

With continued reference to FIG. 5, at step 510, computing device 104 generates at least a network 112 as a function of user venture 108 and at least a flutter element 116. Network 112 includes any of the network 112 as described above in reference to FIGS. 1-4. Flutter element 116 includes any of the flutter element 116 as described above, in reference to FIGS. 1-4. Computing device 104 generates at least network 112 by retrieving at least a user signature 120 of a plurality of user signatures relating to flutter element 116. User signature 120 includes any of the user signature 120 as described above, in reference to FIGS. 1-4. Computing device 104 produces at least an input 124 as a function of user signature 120 using at least a cryptographic function 128. Input 124 includes any of the input 124 as described above, in reference to FIGS. 1-4. Cryptographic function 128 includes any of the cryptographic function 128 as described above in reference to FIGS. 1-4. Computing device 104 generates network 112 as a function of input 124 and user venture 108. As a non-limiting example network 112 may include one or more computers that are interconnected via a complex system of communication channels to at least relate information of a user venture and a flutter element.

Still referring to FIG. 5, at step 515, computing device 104 identifies at least a logical input 132 as a function of network 112 using an authentication operator 136. Logical input 132 includes any of the logical input 132 as described above in reference to FIGS. 1-4. Authentication operator 136 Includes any of the authentication operator 136 as described above, in reference to FIGS. 1-4. As a non-limiting example logical input 132 may include at least an input that fulfills the user venture as authenticated by authentication operator 136.

Still referring to FIG. 5, at step 520, computing device 104 transmits a notification 140 as a function of logical input 132 to at least network 112. Notification 140 includes any of the notification 140 as described above, in reference to FIGS. 1-4. As a non-limiting example, notification 140 may include one or more signals, transmissions, lights, sounds, and the like there of to notify the user of a particular outcome.

Referring again to FIG. 1, an exemplary embodiment of user venture 108 may include, without limitation, a firm wager. As used in this disclosure "firm wager" is a wager that establishes a firm monetary limit to a particular wager. For example, and without limitation, a first individual may establish a user venture on a sporting event, wherein the user wagers $50.00 that a golfer will place between $6^{th}$ and $10^{th}$ place in a tournament with a wager line of +250. A second individual may wager $80 that the golfer will not place between $6^{th}$ and $10^{th}$ place. However, the $80 may not cover the wager line of +250, wherein the first individual would be owed $125.00. Computing device 104 may determine this wager difference and reduce the amount wagered from user venture 108 to maintain the wager line of +250. For example, and without limitation, the first individual's wager of $50 may be reduced to $32.00, such that should the first individual succeed in the wager, the first individual would receive $80.00 due to the wager line of +250. Additionally, or alternatively a third individual may wager that the golfer will not place between $6^{th}$ and $10^{th}$ place, wherein the third individual may input a flutter element up to $45.00 to fulfill the remainder of the potential $125.00 that the first individual may receive should that flutter element be deemed logical.

Still referring to FIG. 1, an exemplary embodiment of user venture 108 may include, without limitation, a flex wager. As used in this disclosure "flex wager" is a wager that equalizes all flutter elements of one logical input of a wager. For example, and without limitation a first individual may establish a user venture on a sporting event, wherein the user wagers $50.00 that a football team will win a game with a wager line of +250. A second individual may provide a flutter element of $80.00 that the football team will not win the game. A third individual may also provide a flutter element of $100.00 that the football team will not win the game. The first individual would need to receive $125.00 should that flutter element be deemed the logical input, wherein the second individual's bet and the third individual's bet would both be reduced to $62.50 to fulfill the potential $125.00 that may be awarded to the first individual.

Still referring to FIG. 1, an exemplary embodiment of user venture 108 may include, without limitation, a wager room. As used in this disclosure "wager room" is a network that allows for flutter elements to go be placed in real time. For example, and without limitation, a video game streamer may be streaming on platform, wherein any user on network 112 may create a wager room for him. Flutter elements in the wager room may be related the stream. A player may write a particular code and/or text that becomes a keyword meaning such as [this game], with the [ ] around the word indicating the keyword for the user venture associated with the live streaming event. As a further non-limiting example a user may bet, "streamer will win [this game]." The user may establish a time limit on the wager for individuals to provide a flutter element. Additionally or alternatively, the user could also use the key phrase, [next game], wherein the game after the game that is being played at the moment that the user venture is made. As a non-limiting example, a user may enter "streamer will win [next game]", wherein the user is establishing a user venture relating to a bet that the videogame streamer will win the game after.

Still referring to FIG. 1, an exemplary embodiment of user venture 108 may include, without limitation, a pool. As used in this disclosure "pool" is a group of users that enter a fixed monetary value for flutter element 116 such as for an event having multiple participants. For example, and without limitation a user may establish a pool with a $5.00 wager, wherein the pool allows individuals to select a winner of a 100-person battle royal. Additionally or alternatively, a secret line may be established in pool to limit bias towards selecting a particular person in the 100-person battle royal. For example, and without limitation, users may place wagers on the 100-person battle royal, wherein once the 100-person battle royal starts the likelihood that a particular player may win is presented to the individuals that provided flutter element 116. Additionally or alternatively, pool may include one or more complex pools, wherein a complex pool allows a user to provide a flutter element that relates to one or more rankings of user venture 108. For example, and without limitation. For example, and without limitation, users may rank and/or select a list of 10 persons in a 100-person battle royal, wherein the logical input is identified as the user who has the closest top ten list. Additionally or alternatively, a user may enter a flutter element that has a logical input relating to a degree of accuracy, wherein a degree of accuracy is how close in accuracy a user predicted the top ten list. For example, and without limitation, the user who predicted the most accurate list of top ten persons will receive 40% of the monetary winnings, the user who predicted the second most accurate list of top ten persons will receive 30% of the monetary winnings, the user who predicted the third most accurate list of top ten persons will receive 20% of the monetary winnings, and the user who predicted the least accurate list of top ten persons will receive 10% of the monetary winnings. Additionally or alternatively, there may be a moveable scale to allow the user that establishes pool to scale the monetary winning percentages more heavily towards the most accurate flutter element or more spread out. For example, and without limitation, a slide may identify that the most accurate flutter element may receive 60% of the monetary winnings and the subsequent accuracies of flutter elements may receive 20%, 15%, 5% from most to least accurate.

Still referring to FIG. 1, an exemplary embodiment of user venture 108 may include one or more house elements. As used in this disclosure "house element" is an element that allows a user to establish a responsibility of monetary fulfillment for user venture 108. As a non-limiting example, house element may allow a user to identify that the user establishing the user venture will be responsible for providing the monetary funds to the user's placing flutter elements. As a further non-limiting example, a video game developer may provide a house element of the developer's responsibility for providing monetary funds to users providing flutter elements, wherein the funds may be up to a predetermined amount (such as $1,000.00) for a particular video game tournament. The video game developer would then be responsible for providing the monetary funds to the user that provides logical input 132 for that user venture.

Still referring to FIG. 1, an exemplary embodiment network 112 may include a social networking component. As used in this disclosure "social networking component" is a component that allows users to gain notoriety by displaying logical inputs relating to flutter elements. As a non-limiting example, a leaderboard for a set period of time, wherein a period of time includes days, weeks, months, years, and the like thereof for users that provide logical inputs relating to flutter elements. A first user may develop a profile relating to their logical inputs such that subsequent users may follow and/or join user ventures that the first user is participating in. Additionally, or alternatively, social networking component may communicate and/or connect with additional social networking platforms such as Facebook and/or Instagram.

Still referring to FIG. 1, computing device 104 may identify logical input 132 and transmit a confirmation signal to users on network 112. As used in this disclosure "confirmation signal" is one or more signals that are transmitted to users such that users may confirm the logical input of the user venture. For example, and without limitation, a logical input may be identified where, 20 individuals all agree that the logical input is correct. Additionally or alternatively, a logical input may be identified, wherein 15 individuals agree that the logical input is correct, but 5 individuals may identify the logical input to be incorrect. Computing device 104 may then determine an honesty parameter as a function of the discrepancy, wherein an honesty parameter identifies one or more users that may be reporting incorrectly. As a non-limiting example, computing device 104 may determine a reasonable monetary deposit to be inputted prior to providing flutter element 116, wherein a successful honesty parameter would provide the deposit back to the user. Alternatively, a user that fails to fulfill honesty parameter may forfeit the reasonable monetary deposit to either the user that provided the logical input and/or a third party.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
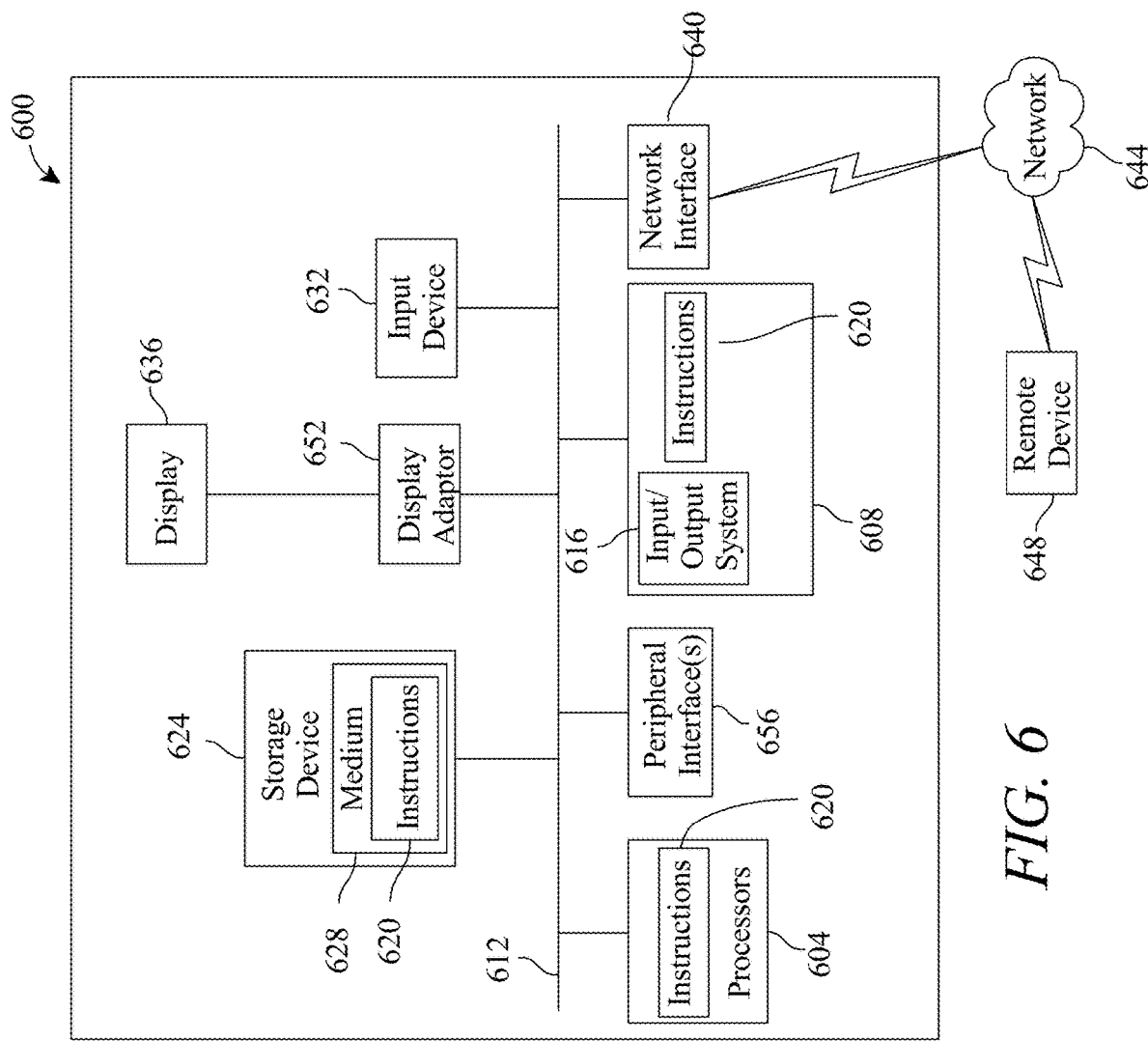
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for transmitting a notification to a network, the system comprising a hardware computing device, the hardware computing device comprising a processor and configured to:
   identify at least one user venture of a plurality of user ventures;
   generate at least one network as a function of the at least one user venture and at least one flutter element, wherein the at least one flutter element has a monetary value, wherein generating the at least one network further comprises:
   retrieving at least one user signature of a plurality of user signatures relating to the at least one flutter element;
   producing at least one input as a function of the at least one user signature using at least one cryptographic function; and
   generating the at least one network as a function of the at least one input and the at least one user venture;
   identify at least one logical input as a function of a possibility outcome and the at least one network using an authentication operator, wherein the possibility outcome is a measure of likelihood that the at least one user venture will occur;
   transmit a notification as a function of the at least one logical input to the at least one network, wherein the notification includes:
   information on whether a user of a plurality of users of the at least one network has initiated a wager of the at least one user venture to complete the occurrence of the least one user venture; and
   a community-based authentication element relating to the at least one user venture, wherein the community-based authentication element is a notification that signals at least one user of the plurality of users to input an authentication element relating to the at least one user venture which validates or invalidates the logical input; and
   incentivize, using an encouragement model, at least one user of the at least one network to provide a response based on the community-based authentication element, wherein upon submission of a predetermined number of responses the at least one user achieves an incentive award.

2. The system of claim 1, wherein identifying the at least one user venture includes determining at least a two-value logical function and identifying the at least one user venture as a function of the two-value logical function.

3. The system of claim 1, wherein generating the at least one network includes determining at least a probability algorithm as a function of the at least one user venture and generating the at least one network as a function of the probability algorithm and the at least one flutter element.

4. The system of claim 1, wherein the at least one cryptographic function includes at least a commitment cryptographic primitive.

5. The system of claim 1, wherein the at least one cryptographic function includes at least a secure multiparty computation.

6. The system of claim 1, wherein identifying the at least one logical input further comprises:
   retrieving at least a validity parameter as a function of the at least one user venture;
   determining at least a validity component of the at least one input as a function of the authentication operator; and
   identifying the at least one logical input as a function of the validity parameter and the validity component.

7. The system of claim 1, wherein identifying the at least one logical input further comprises determining at least one k-server algorithm and identifying the at least one logical input as a function of the authentication operator and the at least one k-server algorithm.

8. The system of claim 7, wherein determining the at least one k-server algorithm further comprises:
    identifying at least a server in a domain of discourse;
    obtaining at least a request of the domain of discourse;
    minimizing a distance metric from the server to the request; and
    determining the at least one k-server algorithm as a function of minimizing the distance metric.

9. The system of claim 1, wherein transmitting the notification further comprises:
    decoding the at least one input of the at least one network;
    identifying at least a user as a function of the decoded input that relates to the at least one user signature; and
    transmitting the notification to the user.

10. The system of claim 9, wherein decoding the at least one input further comprises:
    determining at least a decoding key as a function of at least a cryptosystem algorithm;
    identifying at least a uniform resource identifier as a function of the decoding key; and
    decoding the at least one input as a function of the uniform resource identifier.

11. A method for transmitting a notification to a network, the method comprising:
    identifying, by a computing device, at least one user venture of a plurality of user ventures;
    generating, by the computing device, at least one network as a function of the at least one user venture and at least one flutter element, wherein the at least one flutter element has a monetary value, wherein generating the at least one network further comprises:
    retrieving at least one user signature of a plurality of user signatures relating to the at least one flutter element;
    producing at least one input as a function of the at least one user signature using at least one cryptographic function; and
    generating the at least one network as a function of the at least one input and the at least one user venture;
    identifying, by the computing device, at least one logical input as a function of a possibility outcome and the at least one network using an authentication operator, wherein the possibility outcome is a measure of likelihood that the at least one user venture will occur;
    transmitting, by the computing device, a notification as a function of the at least one logical input to the at least one network, wherein the notification includes:
    information on whether a user of a plurality of users of the at least one network has initiated a wager of the at least one user venture to complete the occurrence of the least one user venture; and
    a community-based authentication element relating to the at least one user venture, wherein the community-based authentication element is a notification that signals at least one user of the plurality of users to input an authentication element relating to the at least one user venture which validates or invalidates the logical input; and
    incentivizing, by the computing device, using an encouragement model, at least one user of the at least one network to provide a response based on the community-based authentication element, wherein upon submission of a predetermined number of responses the at least one user achieves an incentive award.

12. The method of claim 11, wherein identifying the at least one user venture includes determining at least a two-value logical function and identifying the at least one user venture as a function of the two-value logical function.

13. The method of claim 11, wherein generating the at least one network includes determining at least a probability algorithm as a function of the at least one user venture and generating the at least one network as a function of the probability algorithm and the at least one flutter element.

14. The method of claim 11, wherein the at least one cryptographic function includes at least a commitment cryptographic primitive.

15. The method of claim 11, wherein the at least one cryptographic function includes at least a secure multiparty computation.

16. The method of claim 11, wherein identifying the at least one logical input further comprises:
    retrieving at least a validity parameter as a function of the at least one user venture;
    determining at least a validity component of the at least one input as a function of the authentication operator; and
    identifying the at least one logical input as a function of the validity parameter and the validity component.

17. The method of claim 11, wherein identifying the at least one logical input further comprises determining at least one k-server algorithm and identifying the at least one logical input as a function of the authentication operator and the at least one k-server algorithm.

18. The method of claim 17, wherein determining the at least one k-server algorithm further comprises:
    identifying at least a server in a domain of discourse;
    obtaining at least a request of the domain of discourse;
    minimizing a distance metric from the server to the request; and
    determining the at least one a k-server algorithm as a function of minimizing the distance metric.

19. The method of claim 11, wherein transmitting the notification further comprises:
    decoding the at least one input of the at least one a network;
    identifying at least a user as a function of the decoded input that relates to the at least one user signature; and
    transmitting the notification to the user.

20. The method of claim 19, wherein decoding the at least one input further comprises:
    determining at least a decoding key as a function of at least a cryptosystem algorithm;
    identifying at least a uniform resource identifier as a function of the decoding key; and
    decoding the at least one input as a function of the uniform resource identifier.

* * * * *